US008412690B2

(12) United States Patent
Hermann et al.

(10) Patent No.: US 8,412,690 B2
(45) Date of Patent: Apr. 2, 2013

(54) IN-MEMORY PROCESSING FOR A DATA WAREHOUSE

(75) Inventors: Alexander Hermann, Heidelberg (DE); Thorsten Winsemann, Hamburg (DE); Martin Heidel, Walldorf (DE); Andreas Thumfart, Heidelberg (DE); Andreas Bader, Wiesloch (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/083,925

(22) Filed: Apr. 11, 2011

(65) Prior Publication Data
US 2012/0259809 A1 Oct. 11, 2012

(51) Int. Cl.
*G06F 7/06* (2006.01)
*G06F 17/30* (2006.01)
(52) U.S. Cl. ......... 707/703; 707/600; 707/812; 707/957
(58) Field of Classification Search .......... 707/999.001, 707/999.1, 999.102, 999.202, 600, 607, 703, 707/715, 741, 812, 957, 958
See application file for complete search history.

(56) References Cited

U.S. PATENT DOCUMENTS

| 6,148,308 | A | 11/2000 | Neubauer et al. | |
|---|---|---|---|---|
| 6,185,556 | B1 | 2/2001 | Snodgrass et al. | |
| 6,754,657 | B2 | 6/2004 | Lomet | |
| 2002/0087500 | A1* | 7/2002 | Berkowitz et al. | 707/1 |
| 2004/0010502 | A1* | 1/2004 | Bomfim et al. | 707/100 |
| 2006/0004801 | A1 | 1/2006 | Hoefer et al. | |
| 2007/0124275 | A1 | 5/2007 | Mishra | |
| 2008/0275916 | A1 | 11/2008 | Bohannon | |
| 2011/0252000 | A1* | 10/2011 | Diaconu et al. | 707/638 |

FOREIGN PATENT DOCUMENTS

| EP | 1909198 A3 | 5/2008 |
|---|---|---|
| WO | 2004046978 A2 | 6/2004 |

OTHER PUBLICATIONS

From Wikipedia, the free encyclopedia, "Time Variance", modified on Oct. 5, 2010.
From Wikipedia, the free encyclopedia, "Temporal Database", modified on Mar. 15, 2011.
Jan Schaffner, Dean Jacobs, Benjamin Eckart, Jan Brunnert, Alexander Zeier, "Towards Enterprise Software as a Service in the Cloud," ICDE Workshops 2010, IEEE 26th International Conference, Mar. 2010.
Jan Schaffner, Jens Krueger, Stephan Mueller, Paul Hofmann, Alexander Zeier, "Analytics on Historical Data Using a Clustered Insert-Only In-Memory Column Database," Industrial Engineering and Engineering Management 2009, IE&EM 2009 16th Internal Conference , Oct. 2009.
International Search Report (from a corresponding foreign application), EP 12002447.6, dated Oct. 15, 2012.

* cited by examiner

*Primary Examiner* — Bruce Moser
(74) *Attorney, Agent, or Firm* — Fountainhead Law Group PC

(57) ABSTRACT

Embodiments of the present invention include in-memory processing for data warehouse applications. In one embodiment, data records from a data warehouse application are stored in a data storage structure of an in-memory database. Data received from the data warehouse may be stored in a queue and loaded into the data storage structure according to predefined rules. Stored data records are associated with in-memory database transactions that caused the stored data record to be stored, and may further be associated with transactions that caused the stored data records to be changed. A mapping is generated to associate requests from the data warehouse application with in-memory database transactions. The data warehouse application may retrieve data in a change data format calculated on-the-fly.

20 Claims, 7 Drawing Sheets

IN-MEMORY PROCESSING FOR A DATA WAREHOUSE

BACKGROUND

The present invention relates to data processing, and more particularly, to systems and methods of processing data for a data warehouse using in-memory data storage.

Data warehouses are used to store large volumes of data for analysis. Data warehouses receive data from a variety of source systems and make the data available for a wide variety of complex analytic queries. As data is received in a data warehouse, the data may be repeatably stored and transformed as the data is massaged into a form that supports the desired analysis. In some applications, data is received in a very granular level and processed across multiple layers, which may transform, merge, consolidate and aggregate data according to the particular needs of an organization.

According to some architectures, as data is received and processed by a data warehouse, data may be stored in a database management system in one or more data containers. For example, the data warehouse may be a software application (a "data warehouse application") operating on one or more computers (e.g., servers). At various points in data processing, the data warehouse may interface with a database management system to store data in database tables of a database. Example database tables accessed by a data warehouse application are an active data table and a change log table. An active data table may store values of data that are current at a particular time. A change log table may store a history of how data has changed over time.

One problem with the above architecture for data warehousing is the time delay associated with accessing data stored in tables of a database management system. Each time a new record is received (e.g., from a source system), data is read from the active data table in the database (if the data exists) and loaded into the data warehouse application. Next, incoming data is compared against active data to determine if any changes have occurred. If the data has changed, yet another database management system transaction is performed to write changes to the change log table. These are just examples of what are sometimes referred to as database management system "round trips", which are time consuming and may delay data processing time in a data warehouse.

The present invention improves data processing in a data warehouse using an in-memory database management system.

SUMMARY OF THE INVENTION

Embodiments of the present invention include in-memory processing for data warehouse applications. In one embodiment, data records from a data warehouse application are stored in a data storage structure of an in-memory database. Data received from the data warehouse may be stored in a queue and loaded into the data storage structure according to predefined rules. Stored data records are associated with in-memory database transactions that caused the stored data record to be stored, and may further be associated with transactions that caused the stored data records to be changed. A mapping is generated to associate requests from the data warehouse application with in-memory database transactions. The data warehouse application may retrieve data in a change data format calculated on-the-fly.

In one embodiment, the present invention includes a method comprising receiving a plurality of data storage requests to store a plurality of first data records, wherein the data storage requests are received in an in-memory database from a data warehouse application, and wherein the data warehouse application and the in-memory database operate on a computer system, storing the plurality of first data records in a first data storage structure of the in-memory database in a memory of the computer system to produce a plurality of stored data records, wherein said storing the plurality of first data records is performed using in-memory database transactions generated by the in-memory database, and wherein particular in-memory database transactions cause previously stored data records to change, associating the in-memory database transactions with the plurality of stored data records in the first data storage structure, wherein each stored data record is associated with a first corresponding in-memory database transaction that caused the stored data record to be stored, and wherein one or more of the plurality of stored data records are associated with a second corresponding in-memory database transaction that caused the one or more of the plurality of stored data records to be changed, generating, in the in-memory database, a mapping, wherein the mapping associates particular data storage requests from the data warehouse application with a corresponding in-memory database transaction, receiving a second request from the data warehouse application to retrieve data, calculating a plurality of second data records in a change data format from the plurality of stored data records based on the mapping, in-memory database transactions associated with particular stored data records, and particular data values in particular stored data records, and sending the second data records to the data warehouse application.

In one embodiment, each data storage request has a unique identifier assigned by the data warehouse application and each in-memory database transaction has a unique identifier assigned by the in-memory database, and wherein mapping comprises storing one unique identifier for a particular data storage request and one unique identifier for a particular in-memory database transaction as a record in a second data storage structure.

In one embodiment, the method further comprises, before storing the plurality of first data records in a first data storage structure, storing the plurality of first data records in a queue.

In one embodiment, each data record stored in the queue is associated with an identifier specifying a particular data storage request.

In one embodiment, each data record stored in the queue is associated with an identifier indicating that the data is new data, update data, or data to be deleted.

In one embodiment, the first data storage structure comprising one or more data fields for storing data from the first data records, a first transaction field for storing a first transaction used to store data in the one or more data fields, and a second transaction field for storing a second transaction used to change data in the one or more data fields.

In one embodiment, causing previously stored data records to change comprises storing a new data record to replace a previously stored data record or deleting a previously stored data record.

In one embodiment, the first data storage structure comprises active data and archived data.

In one embodiment, the calculating comprises accessing a calculation script, wherein the calculation reads the stored data records from the first data storage structure and executes predefined calculations.

In one embodiment, the method further comprises receiving a modification rule corresponding to at least one data storage request, wherein the modification rule is received in the in-memory database from the data warehouse application, the modification rule specifying one or more data processing steps to be performed when storing data in the first data storage structure.

In one embodiment, the modification rule specifies an aggregation function to be performed on data when storing data in the first data storage structure.

In one embodiment, each of the first data records comprises a record mode field specifying how one or more corresponding data fields of the first data records are to be recorded in the first data storage structure.

In one embodiment, the record mode field specifies that the one or more corresponding data fields are to recorded in the first data storage structure as one of (i) a new record, (ii) a deleted record, or (iii) an updated record.

In one embodiment, the method further comprises rolling back one or more storage requests from the data warehouse application.

The following detailed description and accompanying drawings provide a better understanding of the nature and advantages of the present invention.

DRAWINGS

DETAILED DESCRIPTION

Figure 1:
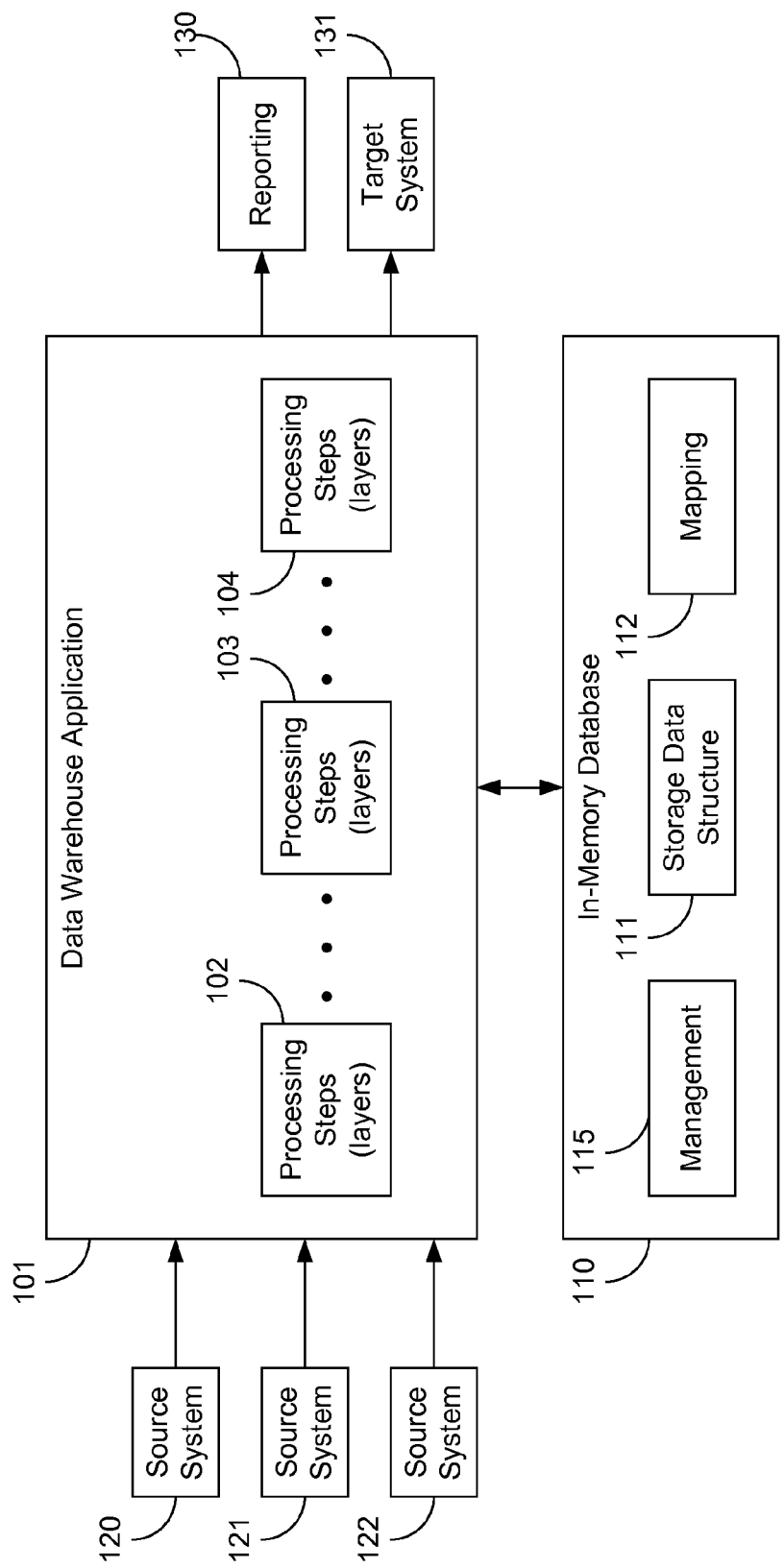
FIG. 1 illustrates a data warehouse application and an in-memory database according to one embodiment of the present invention.

FIG. 1 illustrates a data warehouse application and an in-memory database according to one embodiment of the present invention. Data warehouse application 101 receives data from a variety of source systems 120-122. Source systems 120-122 may include transactional databases, flat files, or a variety of other data systems that can provide data. Data warehouse application 101 may process data from source systems 120-122 using multiple processing steps 102-104. Processing steps 102-104 in a data warehousing application are sometimes referred to as "layers." Processing steps may perform a variety of data processing functions such as staging incoming data from one or more different source systems, propagating and transforming the data, and loading the data into various data structures to support analysis of the data. As illustrated in FIG. 1, data may be processed to support reporting 130 or data may be manipulated to provide data to a target system 131, such as a software application or a data database.

Features and advantages of the present invention include an in-memory database 110 for storing data from data warehouse application 101. In-memory database 110 may include management 115, a data storage structure 111, and a mapping 112 as described in more detail below. In-memory database 110 may perform data storage and portions of data processing for data warehouse application 101 and reduce the use of database management systems for storing data and thereby to reduce data processing delays. Data warehouse application 101 and in-memory database 110 may operate on a computer system, such as one or more computers including one or more processors and memory. For example, data warehouse application 101 and in-memory database 110 may operate on the same server or on multiple servers. Management 115 (or "in-memory database management") may support sending and receiving of signals to and from in-memory database 110 and controlling the functionality of in-memory database 110 as described below, for example.

Data warehouse application 101 may perform processing steps using requests. Requests may be monitored so that data warehouse application 101 may track and control various processes over time. For example, data warehouse application 101 may generate a data storage request to store data. At another point in time, data warehouse application 101 may generate another request to retrieve data (e.g., in a change data format or "delta data" format). Requests may be assigned unique identifiers so that changes to the data between requests or the status of the data during a particular request may be identified by data warehouse application 101.

In-memory database 110 may receive data storage requests from data warehouse application 101 to store one or more data records. The data records are stored in data storage structure 111. As described in more detail below, some embodiments may include a queue data storage structure to storing incoming data. Example data storage structures may include column stores, relational tables, or other structured storage objects. In another embodiment, in-memory database 110 may receive one or more data processing instructions from data warehouse application 101, which may be performed by in-memory database 110 when the data is loaded into data structure 111. The data records stored in data storage structure 111 are referred to as stored data records. In-memory database 110 generates in-memory database transactions to perform various functions, such as storing data. In-memory database transactions may also be assigned unique identifiers, for example. As data is received in in-memory database 110 from data warehouse application 101, some data may be new and some data may be an updated of data already stored in data storage structure 111. Further, some data storage requests may instruct in-memory database 110 to delete stored data records. Accordingly, in-memory database transactions may store new data or cause previously stored data records to change (e.g., update or delete).

In some embodiments, in-memory database transactions may be associated with the stored data records in data storage structure 111. For example, each stored data record may be associated with a corresponding in-memory database transaction that caused the stored data record to be stored in data storage structure 111. As illustrated in more detail below, an in-memory database transaction that stores a particular data record (e.g., CUSTOMER=SAP; AMOUNT=500) may have a particular transaction number (e.g., transaction 334). In this example, transaction number 334, which caused CUSTOMER=SAP; AMOUNT=500 to be stored, may be associated with the data record (e.g., CUSTOMER=SAP; AMOUNT=500; TRANSACTION=334). Further, in some embodiments stored data records may be associated with a second in-memory database transaction that caused the stored data records to be changed. Using the example above, the data record CUSTOMER=SAP; AMOUNT=500 may have updated another previously stored data record CUSTOMER=SAP; AMOUNT=125. Therefore, the previously stored data record may be associated with both a transaction number that cause the data record to be stored (e.g., TRANSACTION=111) and another transaction number that cause the data record to change (e.g., CUSTOMER=SAP; AMOUNT=500; STORAGE TRANSACTION=111; CHANGE TRANSACTION=334).

Data warehouse application 101 may monitor data warehouse "requests", but may not monitor the underlying "transactions" in in-memory database 110 that implement the "requests." Features and advantages of some embodiments include generating, in the in-memory database, a mapping 112. Mapping 112 associates particular data storage requests from the data warehouse application 101 with in-memory database transactions. Referring again to the example above, if data warehouse application 101 generated a data storage request no. 4 to store CUSTOMER=SAP; AMOUNT=500, and if CUSTOMER=SAP; AMOUNT=500 was stored in data structure 111 by in-memory database transaction no. 334, then a mapping may associate the request and transaction as [4, 334], for example.

Mapping 112 may be used by in-memory database 110 to respond to data requests received from data warehouse application 101. For example, data warehouse application 101 may generate a request to retrieve data from in-memory database 110. Data warehouse application 101 may expect that the data be returned in a change data format. For example, rather than showing actual data values, changes in data values are provided in a change data format (sometimes referred to as "delta" data). In response to the request to retrieve data, in-memory database 110 may calculate data records in a change data format based on mapping 112, in-memory database transactions associated with particular stored data records in data structure 111, and particular data values in particular stored data records. Once the data is calculated in a change data format, the calculated data records may be sent to data warehouse application 101 in response to the request.

Figure 2:
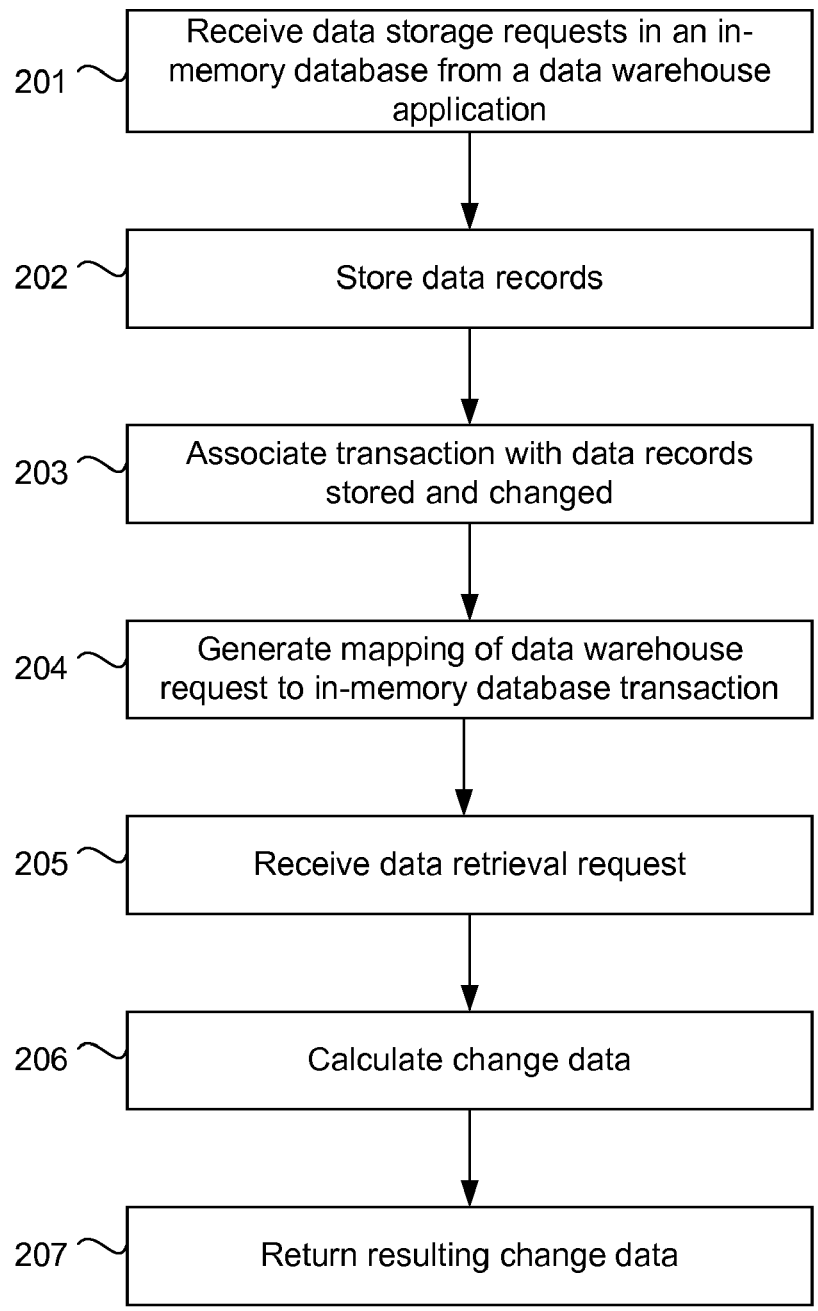
FIG. 2 illustrates a method according to one embodiment of the present invention.

FIG. 2 illustrates a method according to one embodiment of the present invention. At 201, data storage requests are received in an in-memory database from a data warehouse application. At 202, the data records are stored in the in-memory database. In some embodiments, the data records may be stored in a queue, and the in-memory database may receive instructions (e.g., rules) for processing the data as described below. At 203, transactions are associated with data records that were stored and data records that may have changed (e.g., updated or deleted) as a result of the receiving data from the data warehouse application. At 204, a mapping of a data warehouse request to an in-memory database transaction is generated. In some instances, a data storage request from a data warehouse application may be performed on the in-memory database using a single corresponding transaction. In other instances, a single data storage request may be performed on the in-memory database using a multiple transactions, which may be performed in parallel, for example. In yet other instances, multiple data storage requests may be performed on in-memory database using a single transaction. At 205, a data retrieval request is received in the in-memory database from the data warehouse application. At 206, change data (or "delta data) is calculated. At 207, the resulting data is sent to the data warehouse application from the in-memory database in change data format.

EXAMPLE

Figure 3A:
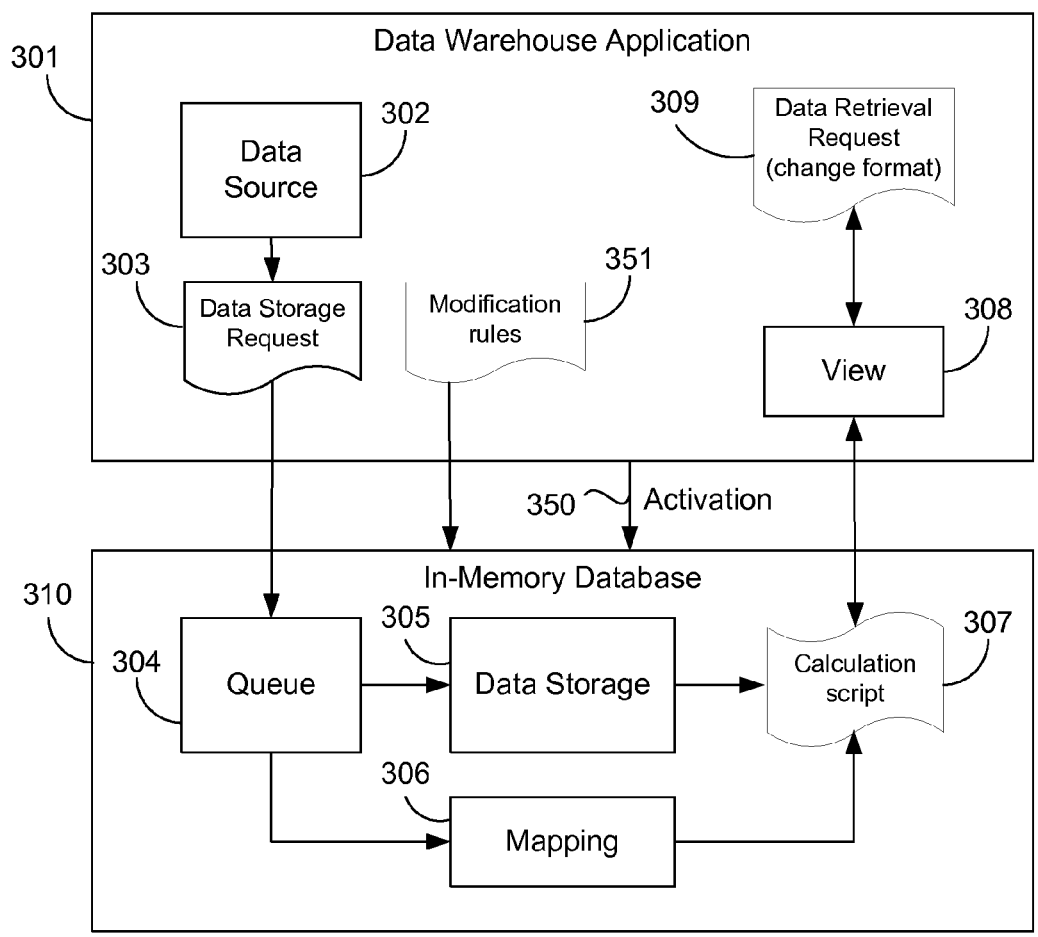
FIG. 3A illustrates a data warehouse and an in-memory database according to another embodiment of the present invention.

FIG. 3A illustrates a data warehouse and an in-memory database according to another embodiment of the present invention. In this example, a data warehouse application 301 stores and retrieves data from an in-memory database 310. A data source 302 may provide the data to be stored. Table 1 shows an example of three data records from data source 302 to be stored in in-memory database 310.

TABLE 1

| RECORDNUMBER | CUSTOMER | AMOUNT | RECORDMODE |
| --- | --- | --- | --- |
| 1 | ABC Co. | 10 | New |
| 2 | XYZ Co. | 5 | New |
| 3 | 123 Co. | 6 | New |

Figure 3B:
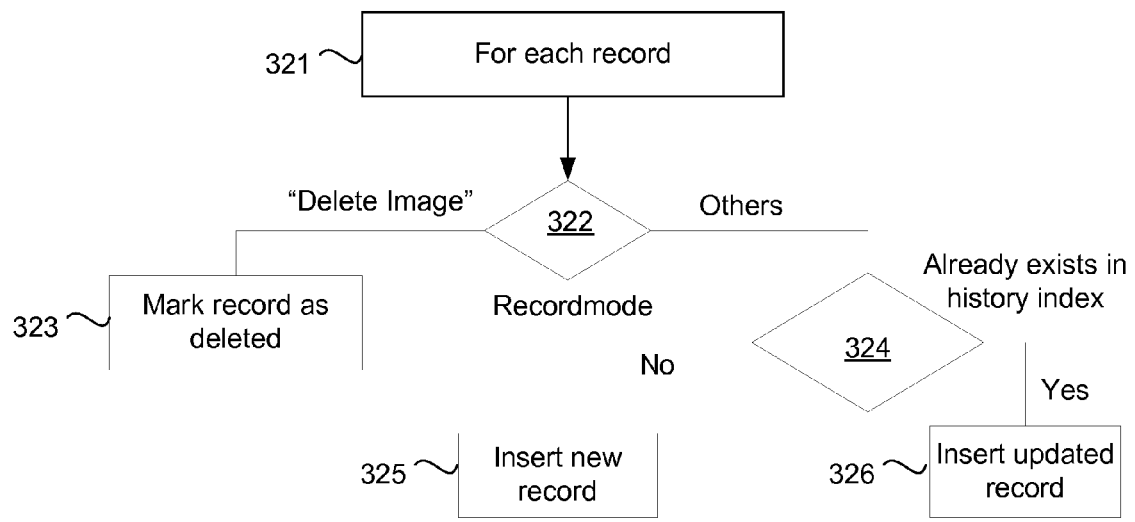
FIG. 3B illustrates a record mode process according to another embodiment of the present invention.

Each data record in this example includes a record number, customer, and amount (e.g., of items purchased). In this example, the data records include a record mode field. A record mode field may be used to specify how one or more corresponding data fields of the data records are to be recorded in the first data storage structure. In this example, the record mode is "New", which indicates that the data is to be recorded as a new record. Other record modes may include "After Image", indicating that the data fields are to be recorded as updates to exiting records, or "Delete Image, which indicates that the data fields are to be used to delete records. The record mode may be generated by the data source, for example. FIG. 3B illustrates a method of processing incoming data records using a record mode, which is described in more detail below.

Data warehouse application 301 may store data from data source 302 using one or more data storage requests 303. Each data storage request may be assigned a unique identifier (e.g., a number) by data warehouse application 301. In this example, in-memory database 310 stores data from data warehouse application 301 in a queue data storage structure ("queue") 304. In one embodiment, queue 304 uses a table as a storage data structure. In this example, queue 304 may be column store, but in other embodiments other data storage structures may be used (e.g., relational tables or other storage objects). Accordingly, the three data records in Table 1 are stored in queue 304 as shown in Table 2 below. The transfer of data from data warehouse application 301 to queue 304 may be performed using a single data storage request or multiple data storage requests. In this example, the three data records in Table 1 are stored in queue 310 using a single request, which is assigned a REQUEST number=1. As each data record is stored in queue, the request number that caused the data record to be stored in queue 304 is recorded in field "REQUEST." Thus, request information generated by data warehouse application 301 is sent to in-memory database 310 for later use.

TABLE 2

| REQUEST | RECORD-NUMBER | CUSTOMER | AMOUNT | RECORD MODE |
| --- | --- | --- | --- | --- |
| 1 | 1 | ABC Co. | 10 | New |
| 1 | 2 | XYZ Co. | 5 | New |
| 1 | 3 | 123 Co. | 6 | New |

In-memory database 310 further includes a data storage structure ("data storage") 305. In this example, data storage 305 is also a table (e.g., a column store). Table 3 shows the schema for data storage 305. For illustrative purposes, Table 3 is initially shown as empty.

TABLE 3

| CUSTOMER | AMOUNT | $cid_from$ | $cid_to$ |
|---|---|---|---|
| | | | |

Data storage 305 may store values from data records received from data warehouse application 301, for example. Here, Table 3 illustrates that the "CUSTOMER" and "AMOUNT" values of received data records are stored. Data records received from data warehouse application 301 may also be manipulated using modification rules 351. Modification rules are described in more detail below. In this example, data storage 305 associates data received from data warehouse application 301 with in-memory database transactions that caused the data to be stored in data storage 305. Table 3 includes a field "$cid_from$" (the "from" field), which stores a unique in-memory database transaction identifier (e.g., a transaction number). As data is stored into data structure 305, the transaction number that caused the data to be stored in data structure 305 may be stored in the "from" field. Accordingly, data is "valid" from the transaction number in the "from" field. Similarly, data storage 305 associates data received from data warehouse application 301 with in-memory database transactions that caused the data to be changed in data storage 305. Table 3 includes a field "$cid_to$" (the "to" field), which stores a unique in-memory database transaction identifier (e.g., a transaction number). As data stored in data structure 305 is changed, the transaction number that caused the data to be change in data structure 305 may be stored in the "to" field. Changes may occur, for example, when new values for existing stored data are recorded in newly added records or when existing stored data is deleted. Accordingly, data is "valid" from the transaction number in the "from" field for all in-memory database transactions up to the transaction number in the "to" field. The "$" before and after the "from" and "to" fields indicates that these fields may be hidden fields in some example implementations.

In-memory database 310 further includes a mapping data storage structure ("mapping") 306. In this example, mapping 306 is also a table (e.g., a column store). Table 4 below shows the schema for mapping 306. For illustrative purposes, Table 4 is also initially shown as empty.

TABLE 4

| Request | $cid_from$ |
|---|---|
| | |

When data is transferred from queue 304 to data storage 305, mapping 306 associates data storage requests from data warehouse application 301 with in-memory database transactions that store data into data storage 305. In this example, mapping 306 includes a "Request" field and a "$cid_from$" field (or "from" field). The "Request" field stores data warehouse application request numbers associated with each data record in queue 304 and the "from" field stores in-memory database transaction numbers that cause data to be stored in data storage 305. As illustrated below, this mapping information may be used to calculate changes in data and provide data to data warehouse application 301 in a "change data format" (i.e., delta data).

In some implementations, data may be transferred from queue 304 to data storage 305 in response to a signal, such as, for example, activation signal 350, which is received in in-memory database 310 from data warehouse application 301. Activation signal 350 may be generated by data warehouse application 301 (e.g., by a user) to commit a data warehouse request to be executed by in-memory database 310, for example. As shown in Tables 5, 6, and 7 below, data from queue 304 is loaded into data storage 305, queue 304 may be cleared, and a mapping is stored in mapping table 306 to associate a transaction and a data warehouse request.

TABLE 5

| REQUEST | RECORD-NUMBER | CUSTOMER | AMOUNT | RECORDMODE |
|---|---|---|---|---|
| | | | | |

TABLE 6

| CUSTOMER | AMOUNT | $cid_from$ | $cid_to$ |
|---|---|---|---|
| IBM | 10 | 753 | — |
| SAP | 5 | 753 | — |
| HP | 6 | 753 | — |

TABLE 7

| Request | $cid_from$ |
|---|---|
| 1 | 753 |

As illustrated in Table 6, after activation, data for "CUSTOMER" and "AMOUNT" from the data records in queue 304 is stored in data storage 305 on in-memory database transaction 753. Queue 304 is emptied as shown in Table 5. Table 7 shows a mapping of data warehouse request 1 to in-memory database transaction 753 that caused data to be stored in data storage 305.

In this illustrative example, another data storage request may be generated by data warehouse application 301 to record data into in-memory database 301. A second request may be generated in response to new data arriving in a source table, for example. Table 8 illustrates three (3) new data records to be stored in in-memory database 310 from a data source 302. In this example, record number 1 is new data, record number 2 is an update (also referred to as an "after image" indicating the new value of the data to be stored), and record number 3 is an instruction to delete a particular data record (also referred to as a "Delete-Image").

TABLE 8

| RECORDNUMBER | CUSTOMER | AMOUNT | RECORDMODE |
|---|---|---|---|
| 1 | Soft Co. | 10000 | New |
| 2 | XYZ Co. | 20 | After-Image |
| 3 | 123 Co. | 6 | Delete-Image |

The new data from data source 302 is loaded into queue 304 in response to a new data storage request 303 generated by data warehouse application 301. Table 9 shows the data in queue 304 after receiving the new data storage request 303.

TABLE 9

| REQUEST | RECORD-NUMBER | CUSTOMER | AMOUNT | RECORDMODE |
|---|---|---|---|---|
| 2 | 1 | Soft Co. | 10000 | New |
| 2 | 2 | XYZ Co. | 20 | After-Image |
| 2 | 3 | 123 Co. | 6 | Delete-Image |

After in-memory database 310 receives an activation signal 350 from data warehouse application 301, the data records shown in Table 9 are transferred into data storage 305 as shown in Table 10 below, and queue 304 may be emptied. As shown in Tables 10 and 11, in-memory database transaction number 822 caused data to be manipulated in data storage 305 (e.g., newly stored, updated, and deleted), and thus a new mapping of data warehouse request 2 to transaction 822 is added.

TABLE 10

| CUSTOMER | AMOUNT | $cid_from$ | $cid_to$ |
|---|---|---|---|
| ABC Co. | 10 | 753 | — |
| XYZ Co. | 5 | 753 | 822 |
| 123 Co. | 6 | 753 | 822 |
| XYZ Co. | 20 | 822 | — |
| Soft Co. | 10000 | 822 | — |

TABLE 11

| Request | $cid_from$ |
|---|---|
| 1 | 753 |
| 2 | 822 |

As illustrated in Table 10, the record for CUSTOMER=ABC Co. previously stored in response to request number 1 is unchanged by request 2 and transaction 822. Thus, there is no value in the "$cid_to$ field and the data remains valid for all transactions after transaction number 753. The record for CUSTOMER=XYZ Co., AMOUNT=5 was modified by request 2. Thus, this record is not valid after transaction number 822, which is implemented by writing transaction number 822 (the transaction that caused the data to change) into the "$cid_to$ field. Similarly, a new record for CUSTOMER=XYZ Co., AMOUNT=20 is added to data storage 305 with the transaction that caused the data to be stored written to the "$cid_from$ field. The record for CUSTOMER=123 Co., AMOUNT=6 was deleted by request 2. Thus, this record is not valid after transaction number 822, which is implemented by writing transaction number 822 (the transaction that caused the data to change) into the "$cid_to$ field. Finally, a new record for CUSTOMER=Soft Co., AMOUNT=10000 is added to data storage 305 with the transaction that caused the data to be stored written to the "$cid_from$ field (i.e., transaction 822).

As mentioned above, in-memory database 310 may receive modification rules 351. Modification rules may specify data processing steps to be performed on data in a data storage request when storing data in data storage 305. For example, Table 12 is an example of new data receive in queue 304, which modifies the previously stored data CUSTOMER=ABC Co.; AMOUNT=20.

TABLE 12

| REQUEST | RECORD-NUMBER | CUSTOMER | AMOUNT | RECORDMODE |
|---|---|---|---|---|
| 1 | 1 | ABC Co. | 20 | After-Image |

Table 13 shows the active data values in data storage 305.

TABLE 13

| CUSTOMER | AMOUNT |
|---|---|
| ABC Co. | 10 |

Example modification rules may include: OVERWRITE, IGNORE, ACCUMULATED(SUM), ACCUMULATED (MIN), ACCUMULATED(MAX). As data is transferred from queue 304 to data storage 305, modification rules 351 may be applied with the following results:
OVERWRITE:

| CUSTOMER | AMOUNT |
|---|---|
| ABC Co. | 20 |

IGNORE:

| CUSTOMER | AMOUNT |
|---|---|
| ABC Co. | 10 |

ACCUMULATED(SUM):

| CUSTOMER | AMOUNT |
|---|---|
| ABC Co. | 30 |

ACCUMULATED(MIN):

| CUSTOMER | AMOUNT |
|---|---|
| ABC Co. | 10 |

ACCUMULATED(MAX):

| CUSTOMER | AMOUNT |
|---|---|
| ABC Co. | 20 |

It is to be understood that the above example rules are merely exemplary of a variety of data processing steps that may be performed on one or more particular data fields by in-memory database 310 according to other embodiments.

To retrieve data, data warehouse application 301 may generate and send a data retrieval request 309 to in-memory database 310. Data retrieval request 309 may be used to retrieve data from in-memory database 310 in a change data format (i.e., a delta data format). In this example, data warehouse application 301 uses a view 308, which may trigger a calculation of change data values from data stored in data storage 305 "on-the-fly". View 308 may be a change log view of data in data storage 305. The retrieval request 309 may be routed to a calculation script 307, for example. The calculation script reads active data (sometimes referred to as after images) stored in data storage 305, calculates the corresponding prior values (sometimes referred to as before images) on-the-fly, and returns the values to the change log view 308.

In this example, the data retrieval request 309 may specify one or more previous data storage requests. For instance, data retrieval request 309 may specify storage request number 2, indicating that data warehouse application 301 is seeking to retrieve data that changed as a result of request 2. One or more transactions can be determined from the mappings. Here, the transaction corresponding to request 2 is transaction 822. Change data may be determined by querying data storage 305 using transaction 822. For example, results for $cid_from$ may be generated as shown in Table 14. These may be referred to as "after images" because they represent the data values "after" transaction 822, which are the currently active data values.

TABLE 14

| CUSTOMER | AMOUNT | $cid_from$ | $cid_to$ |
|---|---|---|---|
| XYZ Co. | 20 | 822 | — |
| Soft Co. | 10000 | 822 | — |

Additionally, results for $cid_to$ may be generated as shown in Table 15. These may be referred to as "before images" because they represent the data values "before" transaction 822.

TABLE 15

| CUSTOMER | AMOUNT | $cid_from$ | $cid_to$ |
|---|---|---|---|
| XYZ Co. | 5 | 753 | 822 |
| 123 Co. | 6 | 753 | 822 |

The Union of the results is shown in Table 16. From these values, change data values may be determined.

TABLE 16

| CUSTOMER | AMOUNT | $cid_from$ | $cid_to$ | Note |
|---|---|---|---|---|
| 123 Co. | 6 | 753 | 822 | Record was deleted |
| XYZ Co. | 5 | 753 | 822 | Before-Image |
| XYZ Co. | 20 | 822 | — | After-Image |
| Soft Co. | 10000 | 822 | — | New record |

Figure 4:
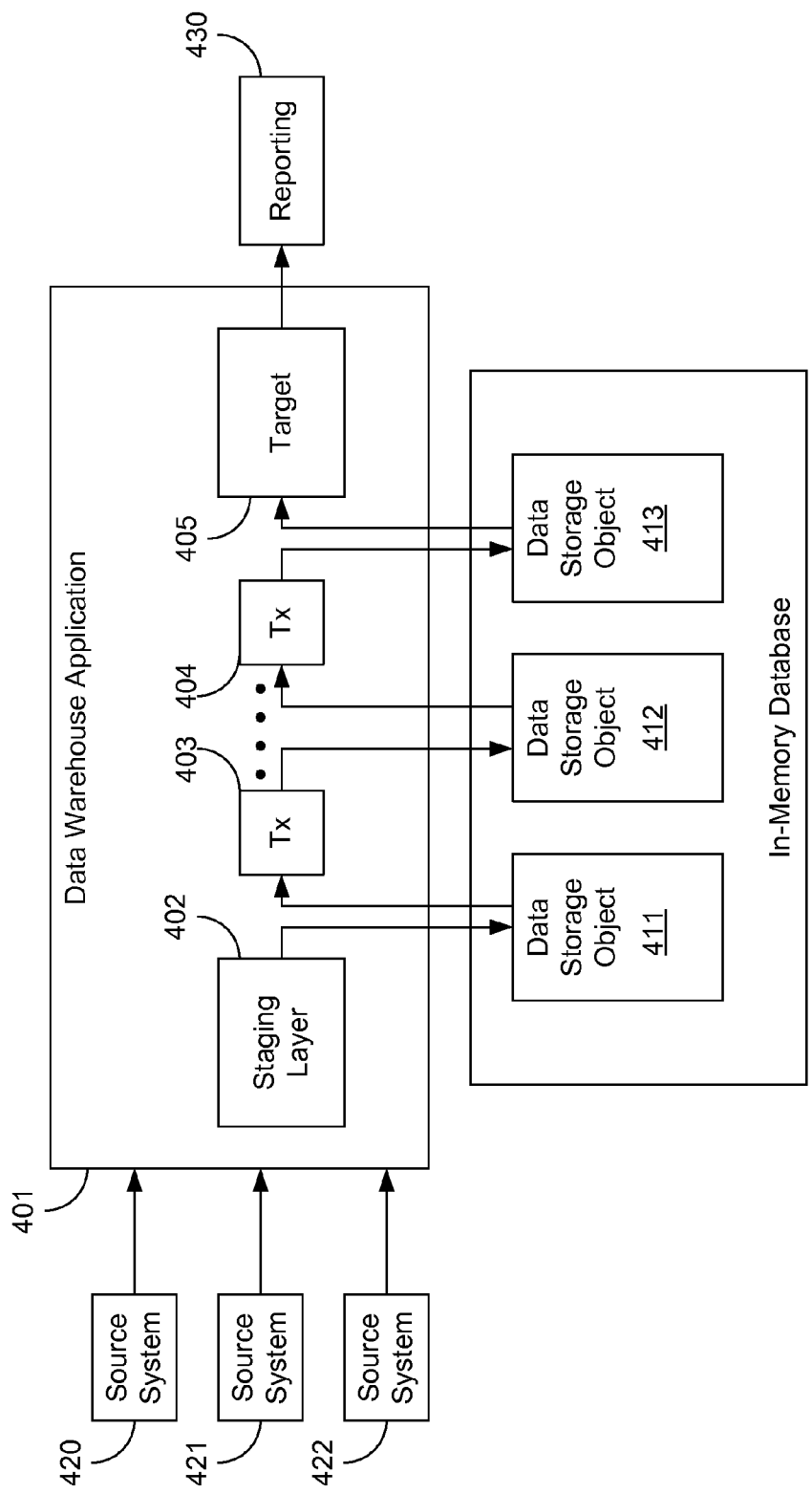
FIG. 4 illustrates a data warehouse and an in-memory database according to another embodiment of the present invention.

FIG. 4 illustrates a data warehouse and an in-memory database according to another embodiment of the present invention. In this example, source systems 420-422 provide data to data warehouse application 401 comprising a data pipeline between one or more sources and a target 405. The data pipeline includes a staging layer 402 and multiple transform layers 403-404 that manipulate data provided to target 405. Target 405 receives analytic queries against the target data and provides data to a reporting component 430. In this example, data warehouse application 410 may include multiple references to multiple instances of data storage structures (e.g., queue 304 and data storage 305 in FIG. 3A) in an in-memory database (sometimes referred to as "DataStore Objects"). This example shows three data storage objects 411, 412, and 413. Different data storage objects may reside in the same in-memory database 450 and have disjoint persistence. In this example, staging layer 402 receives data from one or more sources and generates data storage requests to store incoming data in data storage object 411. Transform 402 may generate requests to retrieve data to be transformed, for example. Transform 402 may further generate data storage requests to store transformed data in data storage object 412. Likewise, transform 403 may generate requests to retrieve data to be transformed, for example. Transform 403 may further generate data storage requests to store transformed data in data storage object 413. Finally, target 404 may generate data requests to retrieve data from data storage object 413. It is to be understood that different numbers and types of transforms and data warehouse processing layers may be used to propagate data from a source to a target. In one embodiment, the target may be a data cube, for example. One example implementation of requests in a data warehouse is illustrated in U.S. patent application Ser. No. 10/838,822 filed on May 3, 2004, which is hereby incorporated herein by reference as one example use requests in a data warehouse.

Figure 5:
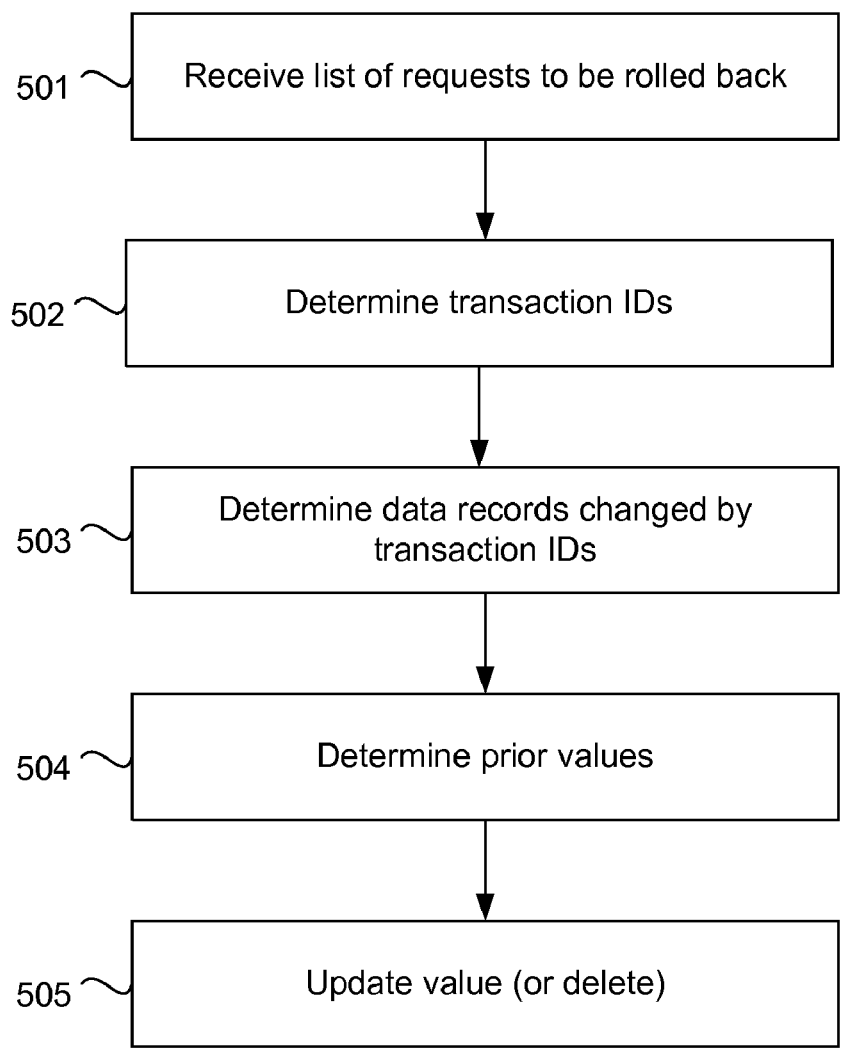
FIG. 5 illustrates a rollback according to another embodiment of the present invention.

FIG. 5 illustrates a rollback according to another embodiment of the present invention. Under some circumstances, data may need to be rolled back to recover from an inconsistent state. Data warehouse application 301 in FIG. 3 may control the recovery process. Referring to FIG. 5, data warehouse application passes the list of requests to be deleted to the in-memory database at 501. In-memory database calculates the state which was valid before the activation of the inconsistent requests. Using the example requests above, the system can rollback Request 2 as follows. At 502, transaction IDs may be determined. For instance, from the mapping table 11 above it can be seen that Request 2 corresponds to cid_from=822. Therefore, the system must restore the state after transaction 821. Next, at 503, data records changed by transaction IDs may be determined. For example, the semantic keys (e.g., customer) that were changed in the transactions to be rolled back may be determined (cid_from>821 OR cid_to>821) as shown in Table 17.

TABLE 17

| CUSTOMER | AMOUNT | $cid_from$ | $cid_to$ |
|---|---|---|---|
| XYZ Co. | 5 | 753 | 822 |
| 123 Co. | 6 | 753 | 822 |
| XYZ Co. | 20 | 822 | — |
| Soft Co. | 10000 | 822 | — |

At 504, prior values for semantic keys may be determined (cid_from <=821 AND cid_to >821) as shown in Table 18.

TABLE 18

| CUSTOMER | AMOUNT | $cid_from$ | $cid_to$ |
|---|---|---|---|
| XYZ Co. | 5 | 753 | 822 |
| 123 Co. | 6 | 753 | 822 |

At 505, delete/update or inserts are carried out. For example, if a particular field has a prior value, the prior value becomes the current active value, and if no prior value exists, then the record is deleted. The rollback result is shown in Table 19.

| CUSTOMER | AMOUNT | $cid_from$ | $cid_to$ |
|---|---|---|---|
| ABC Co. | 10 | 753 | — |
| XYZ Co. | 5 | 753 | — |
| 123 Co. | 6 | 753 | — |

EXAMPLE HARDWARE

Figure 6:
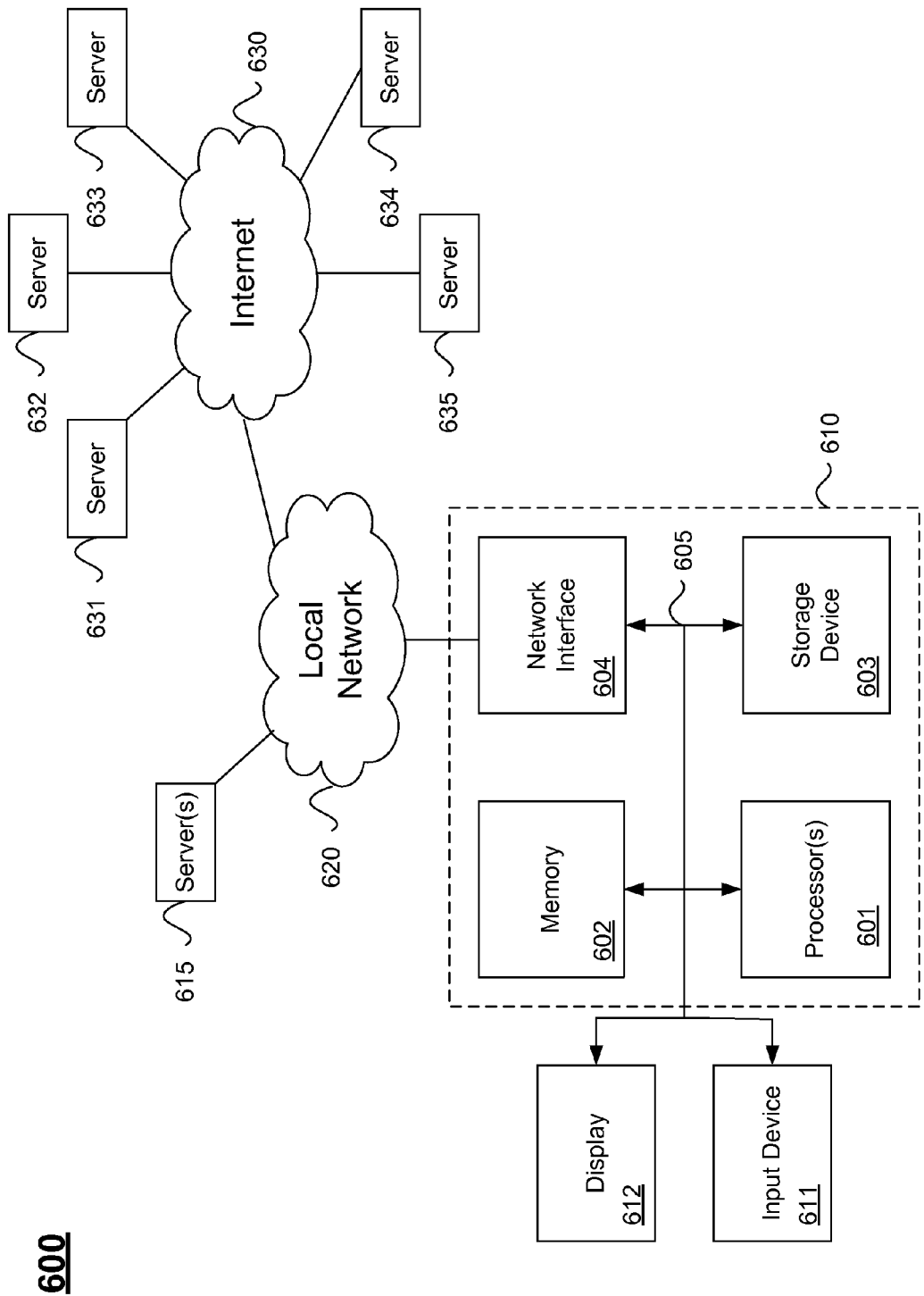
FIG. 6 illustrates hardware of a special purpose computing machine configured with a process according to one embodiment of the present invention.

FIG. 6 illustrates hardware of a special purpose computing machine configured with a process according to one embodiment of the present invention. The following hardware description is merely one example. It is to be understood that a variety of computers topologies may be used to implement the above described techniques. An example computer system 610 is illustrated in FIG. 6, which shows components of a single computer. Computer system 610 includes a bus 605 or other communication mechanism for communicating information, and one or more processor(s) 601 coupled with bus 605 for processing information. Computer system 610 also includes a memory 602 coupled to bus 605 for storing information and instructions to be executed by one or more processor(s) 601, including information and instructions for performing the techniques described above, for example. This memory may also be used for storing variables or other intermediate information during execution of instructions to be executed by processor 601. Possible implementations of this memory may be, but are not limited to, random access memory (RAM) such as DRAM, for example. A storage device 603 is also provided for storing information and instructions. Common forms of computer readable storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of non-transitory computer readable storage mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor(s) 601. The combination of these components may allow a user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) interface, such as Ethernet, to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information through the network interface 604 across a local network 620, an Intranet, or the Internet 630. For a local network, computer system 610 may communicate with a plurality of other computers, such as one or more servers 615. In the Internet example, software components may reside on multiple different computer systems 610 or servers 631-635 across the network. The processes described above may be implemented on one or more server computers, for example. A server 631 may transmit actions or messages from one component, through Internet 630, local network 620, and network interface 604 to a component on computer system 610.

Although the present invention has been described in terms of the particular embodiments and example set forth above, it is to be understood that the disclosure is not to be interpreted as limiting. Various alterations and modifications will be apparent to those skilled in the art after having read the above disclosure. Accordingly, it is intended that the appended claims be interpreted as covering all alterations and modifications as fall within the true spirit and scope of the invention.

What is claimed is:

1. A method comprising:
receiving a plurality of data storage requests to store a plurality of first data records, wherein the data storage requests are received in an in-memory database from a data warehouse application, and wherein the data warehouse application and the in-memory database operate on a computer system;
storing the plurality of first data records in a first data storage structure of the in-memory database in a memory of the computer system to produce a plurality of stored data records, wherein said storing the plurality of first data records is performed using in-memory database transactions generated by the in-memory database, and wherein particular in-memory database transactions cause previously stored data records to change;
associating the in-memory database transactions with the plurality of stored data records in the first data storage structure, wherein each stored data record is associated with a first corresponding in-memory database transaction that caused the stored data record to be stored, and wherein one or more of the plurality of stored data records are associated with a second corresponding in-memory database transaction that caused the one or more of the plurality of stored data records to be changed;
generating, in the in-memory database, a mapping, wherein the mapping associates particular data storage requests from the data warehouse application with a corresponding in-memory database transaction;
receiving a second request from the data warehouse application to retrieve data;
calculating a plurality of second data records in a change data format from the plurality of stored data records based on the mapping, in-memory database transactions associated with particular stored data records, and particular data values in particular stored data records; and
sending the second data records to the data warehouse application.

2. The method of claim 1, wherein each data storage request has a unique identifier assigned by the data warehouse application and each in-memory database transaction has a unique identifier assigned by the in-memory database, and wherein mapping comprises storing one unique identifier for a particular data storage request and one unique identifier for a particular in-memory database transaction as a record in a second data storage structure.

3. The method of claim 1, further comprising, before storing the plurality of first data records in a first data storage structure, storing the plurality of first data records in a queue.

4. The method of claim 3, wherein each data record stored in the queue is associated with an identifier specifying a particular data storage request.

5. The method of claim 3, wherein each data record stored in the queue is associated with an identifier indicating that the data is new data, update data, or data to be deleted.

6. The method of claim 1, the first data storage structure comprising:
   one or more data fields for storing data from the first data records;
   a first transaction field for storing a first transaction used to store data in the one or more data fields; and
   a second transaction field for storing a second transaction used to change data in the one or more data fields.

7. The method of claim 1, wherein the particular in-memory database transactions cause the previously stored data records to change by storing a new data record to replace a previously stored data record or deleting a previously stored data record.

8. The method of claim 1, wherein the first data storage structure comprises active data and archived data.

9. The method of claim 1, wherein said calculating comprises accessing a calculation script, wherein the calculation reads the stored data records from the first data storage structure and executes predefined calculations.

10. The method of claim 1, further comprising receiving a modification rule corresponding to at least one data storage request, wherein the modification rule is received in the in-memory database from the data warehouse application, the modification rule specifying one or more data processing steps to be performed when storing data in the first data storage structure.

11. The method of claim 10, wherein the modification rule specifies an aggregation function to be performed on data when storing data in the first data storage structure.

12. The method of claim 1, wherein each of the first data records comprises a record mode field specifying how one or more corresponding data fields of the first data records are to be recorded in the first data storage structure.

13. The method of claim 12, wherein the record mode field specifies that the one or more corresponding data fields are to be recorded in the first data storage structure as one of (i) a new record, (ii) a deleted record, or (iii) an updated record.

14. The method of claim 1, further comprising rolling back one or more storage requests from the data warehouse application.

15. A non-transitory computer readable storage medium including instructions executable by a computer system to perform a method, the method comprising:
   receiving a plurality of data storage requests to store a plurality of first data records, wherein the data storage requests are received in an in-memory database from a data warehouse application, and wherein the data warehouse application and the in-memory database operate on a computer system;
   storing the plurality of first data records in a first data storage structure of the in-memory database in a memory of the computer system to produce a plurality of stored data records, wherein said storing the plurality of first data records is performed using in-memory database transactions generated by the in-memory database, and wherein particular in-memory database transactions cause previously stored data records to change;
   associating the in-memory database transactions with the plurality of stored data records in the first data storage structure, wherein each stored data record is associated with a first corresponding in-memory database transaction that caused the stored data record to be stored, and wherein one or more of the plurality of stored data records are associated with a second corresponding in-memory database transaction that caused the one or more of the plurality of stored data records to be changed;
   generating, in the in-memory database, a mapping, wherein the mapping associates particular data storage requests from the data warehouse application with a corresponding in-memory database transaction;
   receiving a second request from the data warehouse application to retrieve data;
   calculating a plurality of second data records in a change data format from the plurality of stored data records based on the mapping, in-memory database transactions associated with particular stored data records, and particular data values in particular stored data records; and
   sending the second data records to the data warehouse application.

16. The non-transitory computer readable storage medium of claim 15, wherein each data storage request has a unique identifier assigned by the data warehouse application and each in-memory database transaction has a unique identifier assigned by the in-memory database, and wherein mapping comprises storing one unique identifier for a particular data storage request and one unique identifier for a particular in-memory database transaction as a record in a second data storage structure.

17. The non-transitory computer readable storage medium of claim 15, further comprising receiving a modification rule corresponding to at least one data storage request, wherein the modification rule is received in the in-memory database from the data warehouse application, the modification rule specifying one or more data processing steps to be performed when storing data in the first data storage structure.

18. The non-transitory computer readable storage medium of claim 15, further comprising, before storing the plurality of first data records in a first data storage structure, storing the plurality of first data records in a queue.

19. The non-transitory computer readable storage medium of claim 15, the first data storage structure comprising:
   one or more data fields for storing data from the first data records;
   a first transaction field for storing a first transaction used to store data in the one or more data fields; and
   a second transaction field for storing a second transaction used to change data in the one or more data fields.

20. The non-transitory computer readable storage medium of claim 15, wherein each of the first data records comprises a record mode field specifying how one or more corresponding data fields of the first data records are to be recorded in the first data storage structure.

* * * * *